END-OF-PAGE LIMITING DEVICE

Filed Nov. 2, 1964

INVENTOR
CARL D. RUSSELL

BY Fisher, Christen
Sabol & Caldwell
ATTORNEYS

Oct. 31, 1967 C. D. RUSSELL 3,349,890
END-OF-PAGE LIMITING DEVICE
Filed Nov. 2, 1964 3 Sheets-Sheet 2

INVENTOR
CARL D. RUSSELL

BY Fisher, Christen
Sabol & Caldwell
ATTORNEYS

Oct. 31, 1967 C. D. RUSSELL 3,349,890

END-OF-PAGE LIMITING DEVICE

Filed Nov. 2, 1964 3 Sheets-Sheet 3

INVENTOR
CARL D. RUSSELL

BY Fisher, Christen
Sabol & Caldwell
ATTORNEYS

United States Patent Office 3,349,890

Patented Oct. 31, 1967

3,349,890

END-OF-PAGE LIMITING DEVICE

Carl D. Russell, 1209 Walnut St., Muskogee, Okla. 74401

Filed Nov. 2, 1964, Ser. No. 408,127
8 Claims. (Cl. 197—189)

This invention relates to improvements in roller type limiting devices, and more particularly, to a means to notify the operator of the typewriter upon which the device is installed, that the preselected roller movement limit has been reached, thus enabling the operator to maintain more uniform bottom page margins.

An object of the present invention is to provide a simple device of the character which can be easily attached to or detached from the pintle end of the platen roller.

A further object of the invention is to provide such a device with a means to select proper line spacing for either legal or standard size paper.

A still further object of the invention is to provide a means to notify the operator by a sounding device that the preselected line spacing has been reached.

Yet a still further object of the invention is to provide a means to allow further rotation of the platen roller after the preselected limit has been reached, without damaging the limiting or alarm mechanisms.

A still further object of the invention is to allow the roller to be rotated in the reverse direction without damaging the mechanism.

The above and other objects, features and advantages of the invention will be seen from the following detailed description taken with the accompanying drawings.

Figure 1:
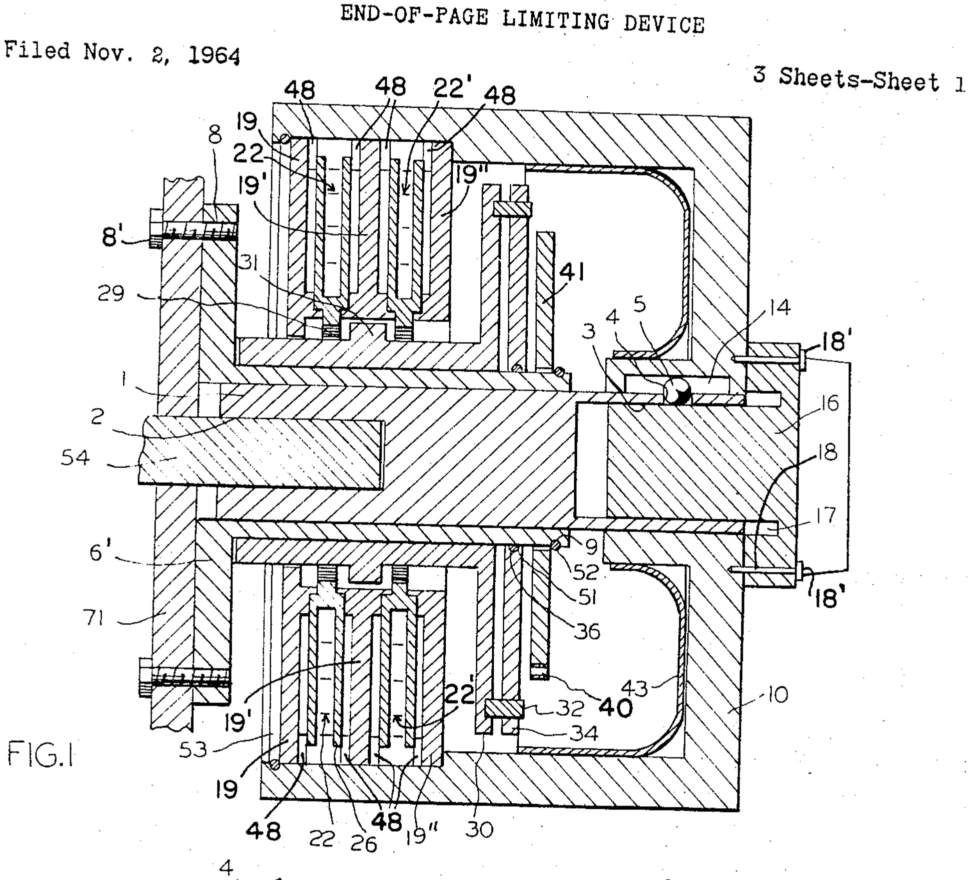
FIG. 1 is an elevational view of a longitudinal section of my invention secured to the pintle end of a platen roller.

Referring particularly to the drawings:

FIG. 1 is a sectional view of the device with the parts in their assembled position. Other more detailed drawings describe their actual construction more fully.

Figures 2, 3, 4, 5, 6:
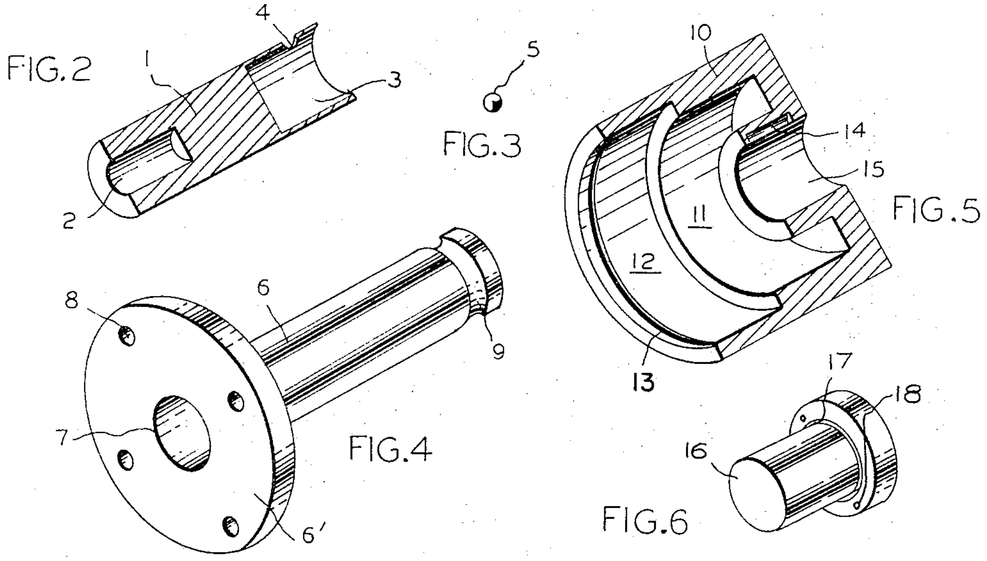
FIG. 2 is a split or sectional view in perspective of the center shaft which attaches to the typewriter pintle shaft.
FIG. 3 shows a ball, which is part of the locking and selection device.
FIG. 4 is a view in perspective of a flanged tubular shaft, to be secured to the typewriter carriage.
FIG. 5 is a split or sectional view in perspective of the case, forming the knob.
FIG. 6 is a perspective view of a plug type locking device.

In FIG. 2, the platen roller shaft extension 1 includes bore 2 for receiving the pintle end 54 of the platen roller. Extension 1 further includes locking plug bore 3 and hole 4 for receiving the locking ball 5 (FIG. 3).

In FIG. 4, tubular shaft 6 includes flange 6' for mounting to the roller carriage through the use of anchoring holes 8 and bolts 8' (FIG. 1). The shaft also includes bore 7 and the inner assembly locking ring groove 9. In FIG. 5, the working mechanism housing 10 forms a knob for the operator to push or pull. The knob has two positions, one for ringing the bell 43 at the bottom margin for letter size paper and the other for ringing the bell at the bottom margin for legal size paper, as well as a third inoperative or centered neutral position in which the bell is not rung. The bell and ringing mechanism recess 11 and limiting reels and mechanism recess 12 are best seen in FIG. 5. They are provided to contain, respectively, the bell 43 and the reels 26. Two reels 26 are provided, respectively, for letter and legal size paper. The outer assembly locking groove 13 is visible in housing 10 at FIG. 5, as are also the slotted locking closed channel 14 and shaft bore 15.

In FIG. 6, the locking plug 16 is provided with a recess 17 and plug anchor holes 18. It locks bore 5 in place, permitting axial movement of housing 10 for selection by the operator.

Figure 7:
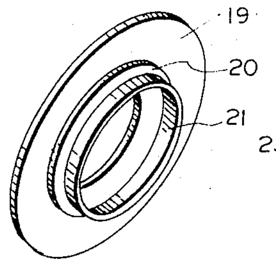
FIG. 7 shows in perspective a guide for holding the reel in position.

In FIG. 7, guide plate 19 holds thrust ring 20 and inner guide 21. As best seen at FIG. 1, three guide plates 19, 19', and 19'' are used to support the two reels 26.

Figure 8:
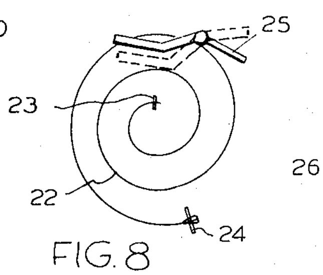
FIG. 8 is an elevational view of a spring and reel locking device.

One reel 26 is equipped with the structure shown in FIG. 8 including spring 22, inner spring anchor pin 23, outer spring anchor pin 24, and reel return lock 25. Spring 22 tightens as the platen rolls to measure its selected length. The other reel 26 is equipped the same except that its spring 22' is of different length to measure the different length by allowing more or less rotation. Thus, for example, one of the springs allows rotation for a standard length paper and the other for a legal size page.

Lock 25 engages reel return locking notch 27 (FIG. 9) controlling the amount of unwind of spring 22 or 22' when the operator releases the selected reel 26, usually at the end of the page.

The reels 26 include serrations 29 for engaging serrations 31 (FIG. 1). After the page is finished, the operator moves housing 10 axially to disengage the serration connection and the selected spring 22 or 22' expands until its associated lock 25 engages notch 27 thereby insuring a return of the spring to the exact starting point. Inner guide recess 28 aids in holding the reels in alignment.

Figure 9:
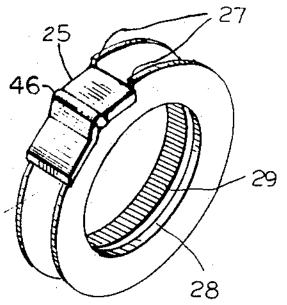
FIG. 9 is a perspective view of the reel.

The reel lock 25 is shown in its locking position in phantom in FIG. 9 (spring unwound to starting point) and in "end of margin" position (spring wound) in solid in FIG. 8. Also FIG. 8 shows the unlocked position in phantom. Each of the springs 22 and 22' is threaded through its reel lock 25 with the spring clip pins or guide 45 holding spring 22, for example, between it and end 44 (see reel lock structure 25 in FIG. 15). The spring then passes above reel lock 25 and back through the large elongated opening of reel lock 25 with pins or arms 46 providing the pivot point connection for the reel lock by fitting in the holes 50 of outer guide rings 48 (FIG. 16). The reel return bumper 47 serves to engage the notches 29 (FIG. 9). Since the anchor pin 24 is also fixed in ring 48 at hole 49, tightening with spring 22 will lift the bumper end 47 slightly above the notch 27 and loosening of the spring 22 will cause engagement of bumper end 47 in notch 27.

Figure 10:
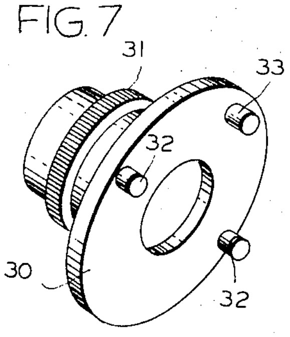
FIG. 10 is a perspective view of the hub and reel engaging device.

In FIG. 10, the reel locking hub or plate 30 includes hub serrations 31, spring securing pins 32, and bell actuating pin 33.

Figure 11:
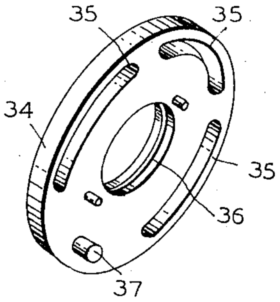
FIG. 11 is a perspective view of a plate, a portion of the restricting and bell-ringing mechanism.
Figure 12:
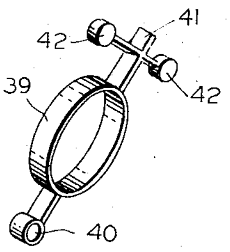
FIG. 12 is a perspective view of the bell ringer.
Figure 13:
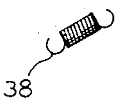
FIG. 13 is a view of a bell ringing mechanism spring.
Figure 14:
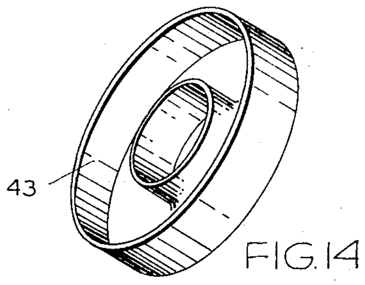
FIG. 14 is the bell in perspective.

In FIG. 11, there is shown a slotted locking plate 34, locking plate slots 35, and a recess 36 for a friction ring, with the bell ringer anchor pin 37 projecting from plate 34. In FIG. 12, bell ringer 39 includes anchor 40, bell ringer spring end 41, and bell clapper 42. In FIG. 13, a bell ringer mechanism spring is shown at 38 and FIG. 14 shows the bell 43.

Figure 15:
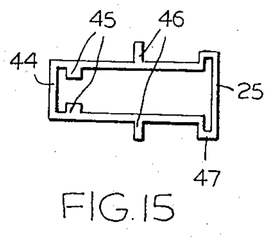
FIG. 15 is a view in section of the reel lock.
Figure 16:
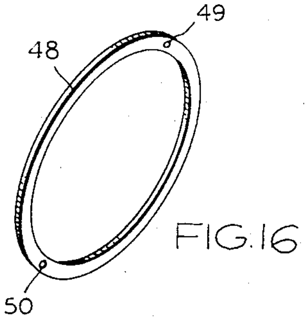
FIG. 16 is the outer guide ring in perspective.

In FIG. 15, the reel lock 25 includes the spring clip pins or guide 45, the pivots 46, and the reel return bumper 47.

In FIG. 16, the locking guide ring 48 includes pivot hole 50 for an arm of reel lock 25 and hole 49 for spring outer end anchor pin 24.

In FIG. 9 the bumper end 47 is shown in locking position against notches 27 and in FIG. 8 the phantom illustration of reel lock 25 shows the slight pivotal movement which unlocks the bumper end 47 from the notches 27 (FIG. 9).

Figure 17:
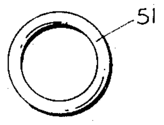
FIG. 17 is an elevational view of a neoprene friction ring.
Figure 18:
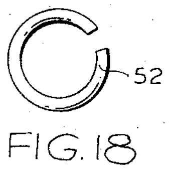
FIG. 18 shows in elevation the inner assembly lock ring.

In FIG. 17, there is shown a friction ring 51 and,

In FIG. 18, the inner assembly lock ring 52 is depicted.

Figure 19:
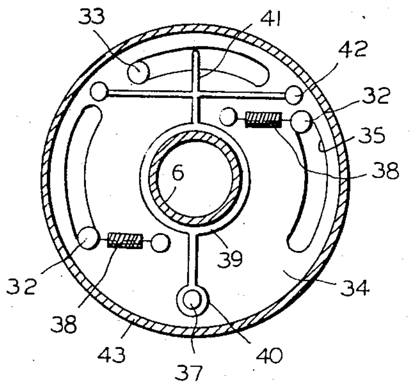
FIG. 19 shows in elevation the bell ringing mechanism at rest position.

FIG. 19 is a view of the bell ringer mechanism in assembled, at rest position, in which there is shown the spring securing pins 32 of plate 30 (FIG. 10), plate slots 35, bell actuating pin 33, slotted locking plate 34, flanged tubular shaft 6, bell ringer anchor pin 37, bell ringer mechanism springs 38, bell ringer 39, the bell ringer anchor 40, the bell ringer spring end 41, the bell clapper 42, and the bell 43.

Figure 20:
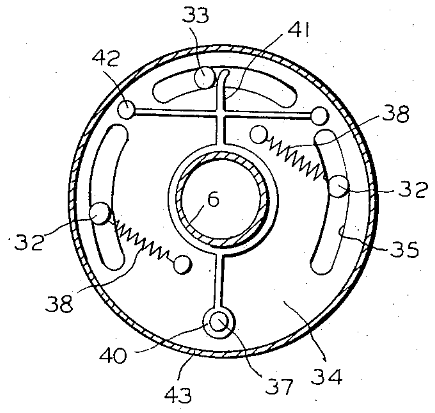
FIG. 20 shows in elevation the bell ringing mechanism in working position.

Another view of the bell ringer mechanism is shown in FIG. 20 with the aforementioned parts being illustrated in their working positions as moved by the limiting mechanism. This view shows the pins 32 and pin 33 moved in the slots 35 of plate 34. Bell ringer mechanism spring 38 are in a stretched position and bell activating pin 33 is bending the bell ringer spring 41 to pass thereover and causes the clapper 42 to ring the bell.

Figure 21:
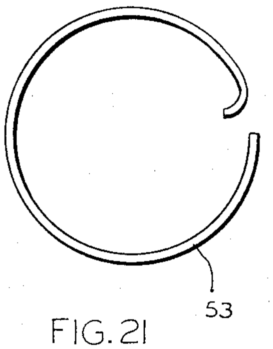
FIG. 21 is an elevational view of the outer assembly locking ring.

In FIG. 21, the outer assembly lock ring is designated at 53.

Figure 22:
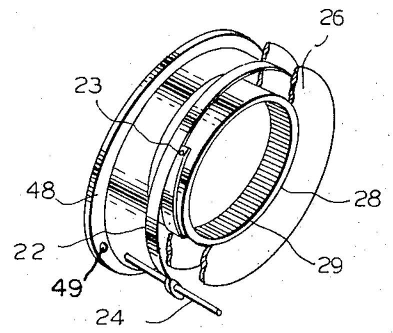
FIG. 22 is a reel and spring assembly in perspective.

In FIG. 22, a cut-away view of the reel assembly, there is shown the reel spring 22, the inner spring anchor pin 23, the outer spring anchor pin 24, the reel 26, the inner guide recess 28, the reel serrations 29, and the outer guide 48.

Figure 23:
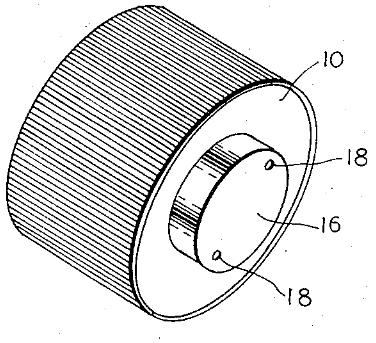
FIG. 23 is an outside view of the invention in perspective.

In FIG. 23, the knob of this invention is shown at 10, housing the aforementioned parts with the locking plug 16 and locking plug holes 18 with anchor pins visible at 18′ in FIG. 1.

Basically, the limiting device is adapted for attachment to a typewriter having a platen with a pintle and frame. A case 10 is provided for housing the limiting device with the case supported on shaft 1 attached to receive the pintle 54 of the platen for rotating the case and permitting longitudinal movement of the case relative to the shaft through ball bearing 5 which is set in hole 4 in shaft 1 with longitudinal recess 14 in housing 10 enabling relative longitudinal movement of the case and shaft, but insuring that the case and shaft rotate with the platen. A tubular member 6 is adapted to be affixed to the typewriter frame and to contain the shaft 1 for rotation therein. A hub 30 is set on the tubular member 6 for rotation relative thereto with guide means 48 in the form of annular rings fixed in the internal periphery of case 10 serving to guide a pair of reels 26 disposed in spaced-apart relation and movable with the case longitudinally of the hub 30. The hub 30 carries a serrated portion 31 for engagement with one of the reels 26 depending upon the longitudinal position of the case relative to the shaft 1.

Spring means 22 and 22′ are fixed respectively to the reels and to the case for winding through rotation of the case. The spring means are in reality indirectly or not directly fixed to the case, but rather to the locking guide rings or means 48 which are press fitted within the case 10 as shown in FIG. 1. The pins 24 engage the holes 49 of guide rings 48 and the arms 46 engage the holes 50. Locking means 34, in the form of an annular plate, is carried by the tubular member and resilient means shown as the small springs 38 in FIG. 20, interconnecting the locking plate and the hub means.

Thus, the selected spring 22 may be wound on its associated reel 26 for a predetermined distance or length of page (one spring 22′ usually conforming to the length of a legal size page and the other spring 22 conforming to the length of a letter size page). After a predetermined winding of the selected spring means, rotation is imparted to the hub means 30 by way of the resilient springs 38 which engage pins 32 of hub means 30 (FIG. 10) via slots 35 in locking means 34. This rotation causes the toggle mechanism 42 (FIG. 12) to trip as best pictured in FIG. 20 and ring the bell 43 of FIG. 14.

A protective feature resides in the yieldable connection of friction drag ring 51 (FIG. 17) for holding the locking means 34 to the tubular member 6, but permitting slippage if typing is carried on beyond the end of page indicating distance.

It should be noted that the flanged tubular shaft 6 is fastened securely to the platen roller carriage frame 71 extending outward therefrom at flange 6′ and forms an enclosure with working cearance for shaft 1. Guide plate 19′ is a double guide of the same type as indicated in FIG. 7 as a single guide 19, as can be appreciated in FIG. 1. Also, the inner diameter or bore of plate 19′ is larger than the bore for plate 19. Outer guide rings 48 (FIG. 16) each have a hole 49 for outer end anchor pin 24 of spring 22 (FIG. 8) and also a hole 50 for reel lock pivots 46 (FIG. 15). Reel lock 25 in FIG. 15 has bumper 47 and spring clip pins or guides 45 and pivots 46. The springs loop the guides 45 in order that winding and unwinding of the springs will serve to pivot the reel locks 25. Outward diametrical motion is imparted by the spring 22 or 22′ to end 44 of reel lock 25 when unwinding on associated reel 26, this inducing pivot action of the reel lock 25 causing the bumper 47 to move in the path of reel notch 27 (FIG. 9) and stop the reel rotation when the spring is in its unwound position. This allows the spring to return the reel to a predetermined position.

Either of the reels 26 may be moved by the allowable aforementioned horizontal motion of the knob which moves the case 10 into position securing either reel 26 to hub 30 by the serrations 29 and 31 to cause hub 30 to be rotated. When the selected spring 22 or 22′ is wound to its limit, rotary motion is imparted to the hub 30 to cause hub 30 and flange pins 32 and 33, through limited rotary movement, to exert forces upon holding springs 38 to allow movement causing the pins to move in slots 35. As pin 33 moves in slot 35 of plate 34 and moves across spring end 41 of bell clapper 39 (which is fastened to plate 34 by holding pin 37), it causes a bending motion of spring clapper 39. Pin 33 then passes over end 41 of clapper 39 and allows the clapper ends 42 to strike the bell 43.

The hub 30, plate 34, and bell ringer 39 are held in position by inner locking ring 52 in groove 9 of flanged tubular shaft 6.

The other working mechanisms are secured in the bore of knob housing 10 by locking ring 53 in groove 13 of knob housing 10.

If further movement of the roller is desired beyond the alarm point, the friction ring 51 permits some slippage of plate 34 about shaft 6 without damage to any of the working mechanisms.

The roller may also be turned in reverse motional direction without damaging the mechanism.

As the operator places a sheet in typing position, the limiting mechanism can be readily disengaged and re-engaged in the proper limit range by moving the knob to center position and back to the desired position to select the appropriate margin.

As many changes could be made in carrying out the above construction without departing from the scope of the invention, it is intended that all matter contained in the above description or shown in the accompanying drawings shall be interpreted as illustrative and not in a limiting sense.

I claim:

1. A limiting device for attachment to a typewriter having a platen with pintle and a frame, comprising in combination, a case for housing said limiting device; said case comprising a shaft adapted to receive the pintle of the platen for rotating the case and permitting longitudinal movement of the case relative to the shaft; a tubular member adapted to be affixed to said frame and contain said shaft for rotation of the shaft therein; hub means seated on the tubular member for rotation relative thereto; guide means affixed to said case; a pair of reels in spaced-apart relation carried by said guide means and movable with the case longitudinally of the hub means; said hub means comprising means for selectively engaging one of said reels depending upon their longitudinal positions relative to the hub means; spring means affixed respectively to the reels and to said case for winding through rotation of said case; locking means carried by said tubular member; resilient means connecting said locking means to said hub means whereby further rotation of said shaft after a predetermined winding of the selected spring means imparts rotation to said hub means via the resilient means; bell means; means associated with the hub means to ring said bell means by movement of the hub means; and means for selecting one of the reel means to predetermine the amount of revolution of said shaft and pintle to operate the bell means.

2. The device of claim 1 further comprising reel-lock means fixed to said case and actuable by said spring means when unwound a predetermined amount; said reels each comprising means engageable by said reel-lock means when the selected spring means is so unwound; and said spring means automatically unwinding in response to longitudinal movement of said case to disengage the selected spring means from the hub means.

3. The device of claim 2 further comprising flange means carried by the hub means; pin means protruding from the hub flange means and engaged by the resilient means; said means associated with the hub means comprising clapper means carried by the locking means whereby movement of the hub means causes the pin means to actuate the clapper means to ring the bell means.

4. The device of claim 3 further comprising friction means yieldably retaining the locking means to the tubular member against relative rotation whereby said locking means will yieldably roate relative to said tubular member after said predetermined winding of the selected spring means and ringing of the bell means.

5. The device of claim 4 further comprising a ball; said shaft including a peripheral opening to receive said ball with a portion thereof protruding outwardly of the shaft peripherally; and said case having a longitudinal recess receiving said portion of the ball whereby the case is fixed to the shaft against relative rotation and is longitudinally slideable relative to the shaft.

6. A limit device for attachment to a typewriter having a platen with a pintle and a frame comprising, in combination, shaft means connectable to said pintle for rotation therewith; a housing carried by said shaft means; flange means connectable to the frame for providing a support for said shaft means; engageable hub means carried by the flange means and rotatable relative thereto; a plurality of reel means supported from the housing adjacent the engageable means and selectively engageable respectively with said engageable means for rotation with said pintle after respectively different predetermined amounts of rotation of said pintle; means adapted to be wound in one direction with rotation of said pintle comprising springs respectively connected between said housing and said reel means to be wound about said reel means in accordance with said movement of the pintle means; bell means; bell ringer means; resilient means connected between the shaft means and the engageable means normally holding said bell ringer means from actuating said bell; and means carried by the engageable means enabling actuation of said bell ringer means after a predetermined rotation of said pintle.

7. The device of claim 6 wherein said engageable means includes a flange and protruding pins; and said bell ringer means is supported by said shaft means; and friction means connecting said bell ringer means to said shaft means; said friction means permitting said bell ringer means to rotate with said shaft means after said predetermined rotation of said pintle.

8. The device of claim 7 comprising locking means for said reel means; said locking means being pivotally mounted relative to said reel means and the housing and actuated by the spring means to pivot in one direction with tightening of the spring means and to pivot in the opposite direction with loosening of the spring means; said reel means including stop means; and said locking means being adapted for engagement with said stop means when said spring means unwinds to a return predetermined position.

References Cited

UNITED STATES PATENTS

| | | | |
|---|---|---|---|
| 743,350 | 11/1903 | Treadway | 197—189 X |
| 1,053,923 | 2/1913 | Neidig | 197—189 |
| 1,083,646 | 1/1944 | Wilson | 197—189 |
| 1,697,992 | 1/1929 | Meyer | 197—189 |
| 1,726,487 | 8/1929 | Hoellrigl | 197—189 X |
| 1,757,541 | 5/1930 | Murdock | 197—189 |
| 1,945,753 | 2/1934 | Payton | 197—189 |
| 2,168,070 | 8/1939 | Payton | 197—189 |
| 2,168,195 | 8/1939 | English | 197—189 |
| 2,255,329 | 9/1941 | Payton | 197—189 |
| 2,366,265 | 1/1945 | Jensen | 197—189 |
| 2,404,861 | 7/1946 | Petschauer | 197—189 |
| 2,505,769 | 5/1950 | Hassell | 197—189 |

FOREIGN PATENTS

| | | |
|---|---|---|
| 257,121 | 3/1949 | Switzerland. |

ROBERT E. PULFREY, *Primary Examiner.*

EUGENE R. CAPOZIO, DAVID KLEIN, *Examiners.*

E. T. WRIGHT, *Assistant Examiner.*